INVENTOR.
Robert P. Rohde

United States Patent Office 3,357,310
Patented Dec. 12, 1967

3,357,310
TRANSFER VALVE FOR UTILIZING PLURAL PRESSURE SOURCES
Robert P. Rohde, Saginaw, Mich., assignor to General Motors Corporation, Detroit, Mich., a corporation of Delaware
Filed Mar. 23, 1965, Ser. No. 442,139
11 Claims. (Cl. 91—6)

ABSTRACT OF THE DISCLOSURE

In the preferred form, this invention relates to transfer valves for positively shifting pressure alternate sources to a brake booster when one of the pressure sources fails.

---

This invention relates to hydraulic braking systems and more particularly to a transfer valve for use with a hydraulic booster that is supplied pressure from two independent pressure sources.

Hydraulic braking systems by their very nature demand a constant supply of fluid for proper operation. Power booster assemblies used with hydraulic braking systems require a constant supply of fluid under pressure for proper operation. Certain safety considerations make it practical to have separately powered hydraulic pressure systems for supplying pressure to a hydraulic booster. With this arrangement, a pressure system is either kept in reserve or works in conjunction with another pressure system to supply hydraulic fluid under pressure to a brake booster. When utilizing two pressure sources for a braking system, it is desirable to be able to isolate a system that fails because of a possible drain on a functioning system. A transfer valve performs this function but present day transfer valves of common design may introduce a slight lag in the operation of the booster which might not isolate the malfunctioning system as quickly as might be desired under all conceivable conditions.

It is an object of the present invention to provide an improved transfer valve for use with dual hydraulic pressure systems which provides no lag to a pressure operable device serviced by the pressure systems when one of the systems fails.

It is another object of the present invention to provide an improved transfer valve for use with dual hydraulic pressure systems supplying a single pressure operable device which is responsive to a loss of pressure in one of the systems to immediately isolate the system where a loss in pressure occurs without affecting the operation of the pressure operable device.

It is still another object of the present invention to provide an improved brake booster having transfer valves integrally connected therewith which is adaptable for use with two hydraulic pressure systems whether the systems operate together or a secondary one operates only upon the failure of a primary.

It is a further object of the present invention to provide a transfer valve for use with two hydraulic pressure systems servicing a single pressure operable device which is responsive to a pressure loss to activate an electrically driven pump to an auxiliary system when the primary system fails.

Further objects and advantages of the present invention will be apparent from the following description, reference being had to the accompanying drawings wherein preferred embodiments of the present invention are clearly shown.

Figure 1:
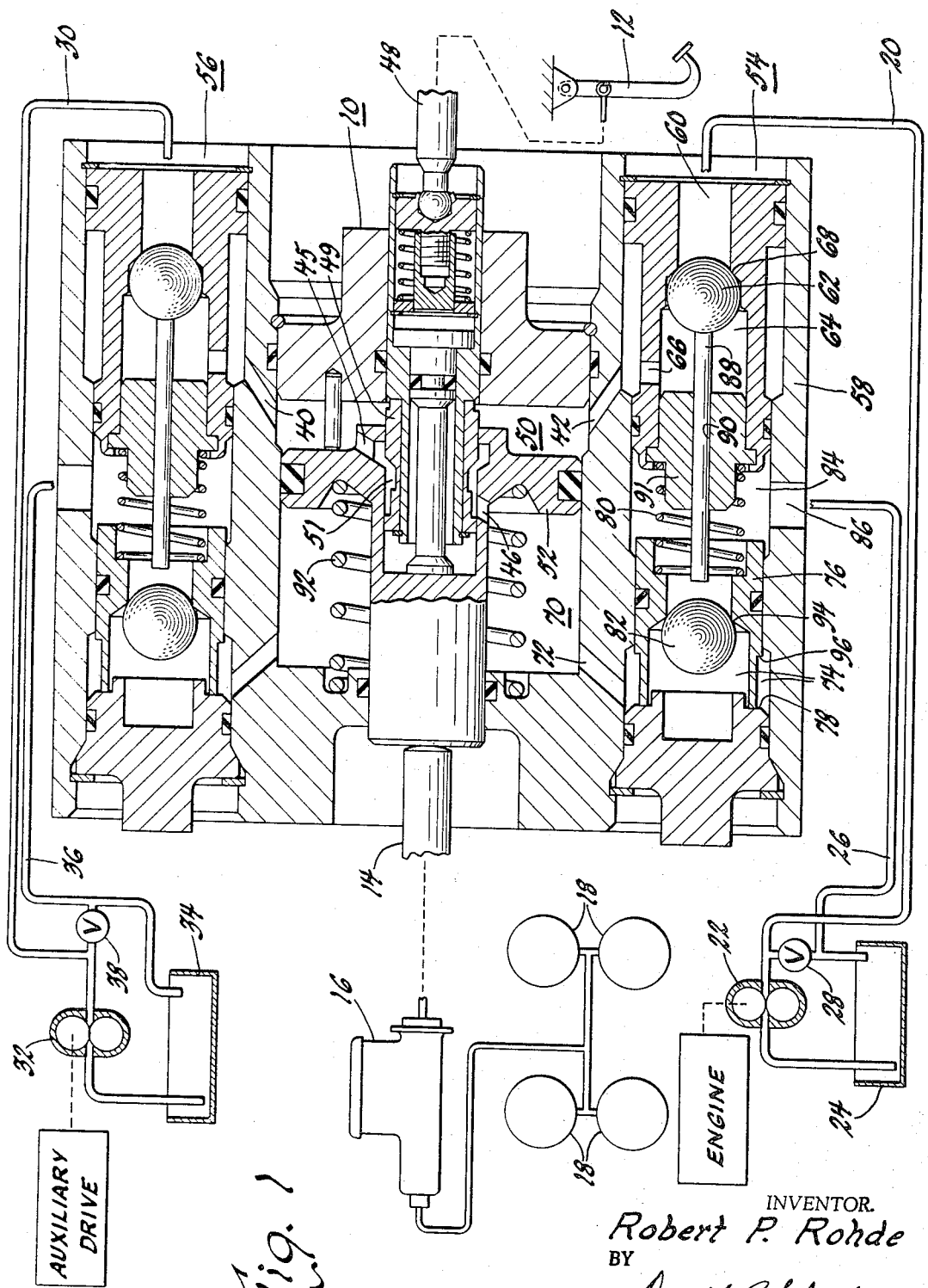
FIGURE 1 illustrates a booster having integrally formed transfer valves therein, with associated hydraulic pressure systems shown diagrammatically.

Referring to FIGURE 1, a braking system is illustrated wherein a brake booster, generally designated by the numeral 10, is actuated by a pivotally supported brake pedal 12 in a conventional manner.

An output element 14 from the booster 10 is adapted to energize a hydraulic master cylinder 16 in a conventional manner to provide hydraulic pressure to wheel brakes 18. The booster 10 is a fluid operable device which is supplied fluid under pressure through a line 20 from an engine driven pump 22 drawing fluid from a reservoir 24. A return line 26, separated from the pressure line 20 by a check valve 28, returns fluid to the reservoir 24.

Another pressure system supplies fluid under pressure through a line 30 from a pump 32 driven by an electric motor or the like drawing fluid from a reservoir 34. A return line 36 returns fluid to the reservoir 34 and is isolated from the pressure line 30 by a check valve 38. In this embodiment, both the engine driven pump 22 and the auxiliary pump 32 operate simultaneously to provide fluid under pressure to the brake booster 10.

Fluid enters booster 10 through inlet ports 40 and 42 and enters chamber 50. Sliding open center piston 52 provides an aperture 45 for fluid ingress and aperture 46 for fluid egress into chamber 70. Piston 49, being slidable in piston 52 and responsive to movement of push rod 48, has a peripheral groove 51 connecting chambers 50 and 70. Movement of piston 48 isolates aperture 45 from aperture 46 resulting in fluid entrapment in chamber 50 and a pressure buildup therein, moving piston 52 leftwardly as viewed in FIGURE 1. This pressure is communicated to the vehicle brakes 18 through master cylinder 16 in a conventional manner.

Transfer valves 54 and 56 are supplied between the engine driven or primary pressure system and the booster valve and between the auxiliary or secondary system and the booster valve, respectively. It is understood that the transfer valves 54 and 56 are identical and function in exactly the same manner and, hence, the description will be limited to one. The transfer valve 54 is formed integrally with the brake booster 10, a portion thereof being a valve body 58. It is understood that the valve body 58 can be formed separately from the booster 10 but, in the preferred embodiment in the interest of economy, is integral therewith. An inlet 60 communicates fluid from the line 20 in any well-known manner and is sealed by a ball 62 disposed in chamber 64 hereinafter referred to as the first chamber. An outlet 66 from chamber 64 communicates fluid from the inlet 60 to the inlet port 42 of the booster 10 when the valve 62 is not on its seat at 68. Fluid normally passing through the open centered piston 52 enters chamber 70 and is communicated through an inlet 72 to a chamber 74, sometimes referred to herein as the second chamber. It should be noted that a slidable open center piston 76 seating against wall 78 effectively divides the second chamber 74 into two portions when the system is unpressurized.

The operation of the piston 76 will be hereinafter described. A spring 80 serves to bias the piston 76 against its seat on wall 78. A ball 82 is disposed for translational movement within the open center piston 76 and serves to close off fluid communication between passage 84 and the second chamber 74. The passage 84 is in communication with an outlet 86 engaging the return line 26. It is therefore seen that fluid under pressure generated by the engine driven pump 22 is communicated through a first chamber of the transfer valve 54 through the brake booster and back through the second chamber 74 to the reservoir 24. A similar path for fluid communication is had through the identical transfer valve 56 from the pump 32 to the reservoir 34. A rod 88 engaging the ball 62 is slidably disposed in an aperture 90 through a plug 91 in the valve body 58 and extends into the second chamber 74 to displace the ball 82 at certain times during the operation of the device.

In operation, the engine driven pump 22 and the pump 32 function simultaneously to provide fluid under pressure to the booster 10 through transfer valves 54 and 56, respectively. As long as no pressure is exerted on the push rod 48, fluid is pumped through the open center piston 52 and returned to reservoirs 24 and 34.

When a vehicle operator desires to apply the brakes, the pivotally supported pedal 12, engaging the push rod 48, causes a movement of piston 49 shutting off free fluid communication through the center of the piston 52. A pressure build-up occurs in chamber 50 resulting in the piston 52 being driven to the left, as viewed in FIGURE 1. The output member 14 is consequently driven into the master cylinder 16 resulting in the application of the wheel brakes 18. Release of the brakes is effected by releasing pressure on the push rod 48, thereby allowing the piston 49 to move toward the right, as viewed in FIGURE 1, and ultimately resulting in a repositioning to a poised position of the piston 52 by means of a spring 92. This is a description of a typical cycle of operation in which pressure is supplied to the booster 10 simultaneously by the primary pump 22 and the secondary pump 32.

If a leak should develop or a loss of pressure be experienced, for example, in the primary system, a pressure loss would be experienced at the inlet 60. The ball 62 normally driven from its seat 68 by pressure in the inlet 60, would return to its seat due to a back pressure from chamber 50 communicated through the inlet port 42, thus preventing leakage past the first chamber 64. At the same time, rod 88 following the movement of ball 62 would move toward the right in aperture 90, as viewed in FIGURE 1. Pressure communicated from chamber 70 through inlet 72 to the second chamber 74 at a point behind ball 82 would drive a ball rightwardly into sealing engagement with a flange 94 of the open center piston 76, preventing fluid communication therethrough to outlet 86. It should be noted that, when the ball 62 is positioned off seat 68, the rod 88 projects into the second chamber 74 an amount sufficient to hold the ball 82 off its seat on the flange 94. It should also be noted that the open center piston 76 is maintained off its seat on wall 78 by pressure exerted against face 96 exposed to pressure through the inlet 72. When the ball 82 is seated at 94 and the ball 62 is seated on 68, no fluid flow occurs through inlet 42 or inlet 72 resulting in the isolation of the primary pressure system from the booster 10.

The booster 10 thereby remains operative due to fluid supplied through transfer valve 56 from the secondary pump 32. No delay occurs in the isolation of the primary system and the booster 10 is completely operative during the cycle just described for the failure of the primary 22. It is understood that the primary system and secondary systems are equivalent in their operation and, therefore, a failure in the secondary system powered by pump 32 would be handled in the same manner as a failure in the primary system pressurized by the pump 22 in the manner previously described. Therefore, the subject invention provides a means for effectively isolating an inoperative pressure system from a booster when a primary and secondary pressure system simultaneously provide pressure to said booster.

Figure 2:
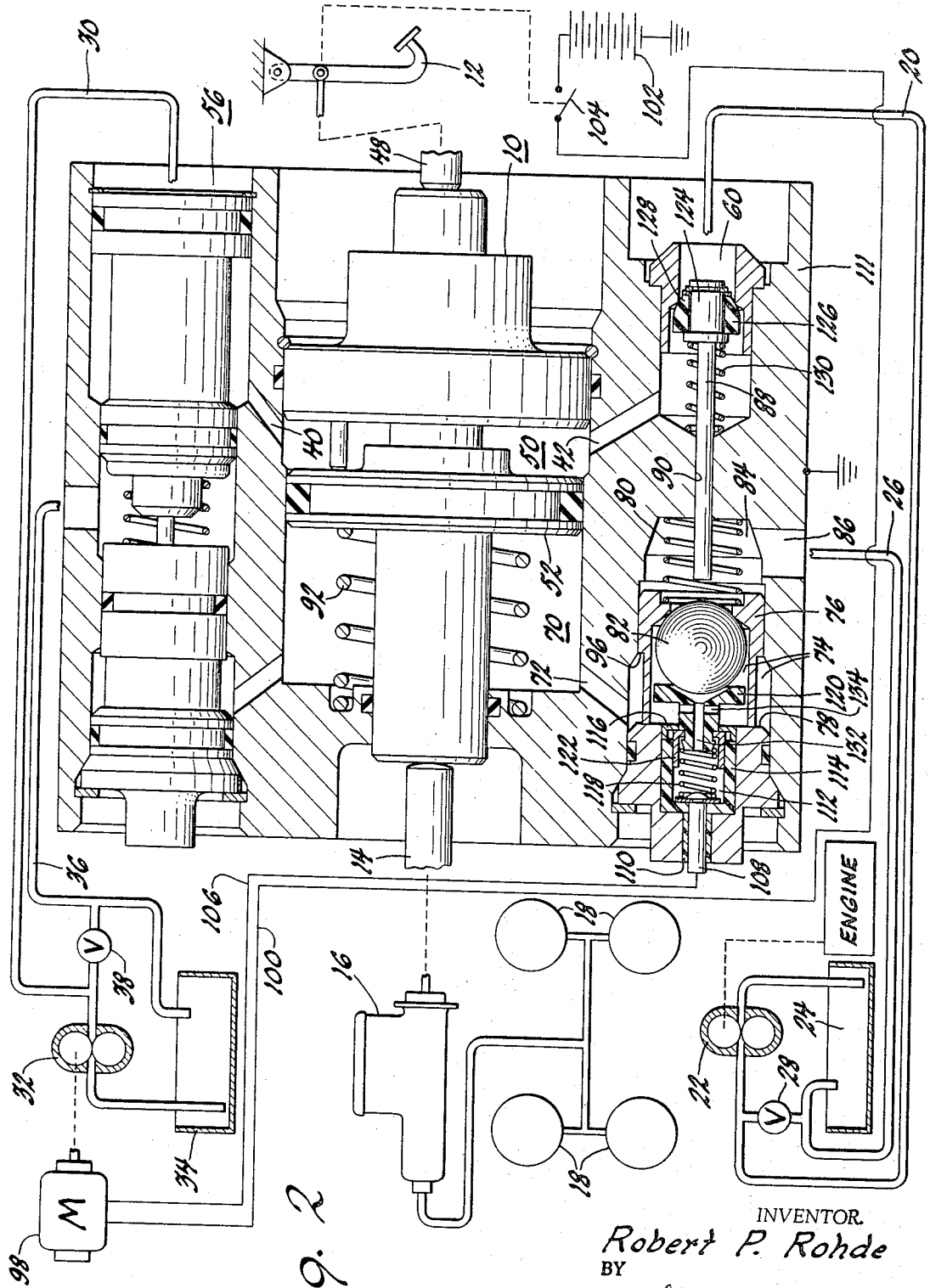
FIGURE 2 is a sectional view of another embodiment of the transfer valve shown in FIGURE 1 wherein the valve is responsive to pressure to energize an auxiliary pressure system.

Referring now to FIGURE 2, the braking system described therein is practically identical to that described in FIGURE 1 in the hydraulic function thereof. The same reference numerals as applied in FIGURE 1 will apply in FIGURE 2 except where different structure is had in the transfer valves, referred to in FIGURE 1 as 54 and 56. FIGURE 2 illustrates a braking system that is designed to operate with only one pump functioning at a time. The pump 32 also referred to in this embodiment as being in the secondary system is driven by an electric motor 98. Power is supplied to the motor 98 through a lead 100 to a battery 102. A switch 104 is actuated by movement of the brake pedal 12 and, therefore, closes the hot lead to the motor 98. A lead 106 from the motor 98 engages a conductive pin 108 carried in an insulator 110 supported by a wall of a valve body 111. A valve body 111 is similar to valve body 58 except as to certain internal components to be hereinafter described.

The second chamber 74 communicates with an auxiliary chamber 112 in which the head of pin 108 extends. An insulating sleeve 114 forms the outer portion of the auxiliary chamber 112 and insulates the pin 108 from a conductive ring 116 engaging the valve body 111. The valve body 111 is grounded. Therefore, it is seen that an interrupted conductive path exists from the motor through lead 106 to the pin 108 and the valve body 111. This conductive path is selectively made complete through a spring 118, made of any well-known conductive material, biasing a piston 120 away from the pin 108. A conductive sleeve 122 is carried by the piston 120 and is slidable on the insulating sleeve 114. The piston 120 is responsive to a force from ball 82 to move to the left and to spring 118 which urges the slidable conductive sleeve 122 into engagement with the conductive ring 116. When pressure falls in chamber 74, ball 82 is free to move and the spring 118 drives the piston 120 and the conductive sleeve 122 rightwardly to the position as viewed in FIGURE 2, until a conductive path is established from the pin 108, through the spring 118, to the ring 116, to ground through the valve body 111. Therefore, it is seen that the slidable sleeve 122 must be positioned, as viewed in FIGURE 2, before power is provided to the electric motor 98. The essence of this embodiment is the effecting of the repositioning of the sleeve 122 from a normal position to energize the motor 98 when a malfunction occurs in the primary system powered by the engine driven pump 22.

The inlet 60 in the embodiment shown in FIGURE 2 is adapted to be closed off by a valve member 124 carrying the pin 90 in a manner essentially substituting for the ball 62 shown in the first embodiment. An elastomeric member 126 formed as the outer portion of the valve member 124 engages a seat 128 to shut off fluid communication between the outlet 42 and the inlet 60 when pressure falls in the line 20. A spring 130 biases the valve member 124 into sealing engagement with the inlet 60 at seat 128 against the force of fluid pressure entering from line 20.

In operation, referring to FIGURE 2, the pump 22 is driven by the engine and is normally utilized to provide pressure for the booster 10. The auxiliary system is pressurized by the pump 32 driven by an electric motor 98 that is designed to function only upon a failure of the primary system. It is understood that transfer valve 56 in this embodiment is identical to that provided in the embodiment in FIGURE 1. Because the primary system functions until the auxiliary system takes over as needed, the transfer valve 56 performs the function of shutting off the auxiliary system upon a failure therein. In view of the fact that the auxiliary system functions only upon failure of the primary system, operation of the valve 56 as a shut-off valve will result in no further power being provided to the booster 10. Another time of functioning of the transfer valve 56 is when the auxiliary system has been functioning due to a primary system failure and repairs are effected on the primary system. This, of course, would occur only on engine shut down and, when repairs were made to the primary system, the conditions to be hereinafter described necessary to bring the auxiliary system into operation would not be present.

Under normal operating conditions, the pump 22 of FIGURE 2 is engine driven and begins to function immediately on engine start. Pressure is generated in line 20 and fluid flows through the inlet 60 unseating the valve member 124. The rod 88 follows the movement of the element 124 and is driven to a position unseating ball 82. Ball 82 engages piston 120 and causes spring 118 to be compressed. Fluid trapped in chamber 112 is vented out through aperture 132 to vents 134 into chamber 74. Fluid flows through the inlet 42 into the booster 10 and therethrough in the manner previously described. Assuming that the booster 10 is not actuated, fluid flows on to the inlet 72 and provides a pressure against face 96 of the open center piston 76. The open center piston 76 moves relative to the ball 82, it being restrained by the rod 88. Fluid is then allowed to flow past the ball to the outlet 86 through the line 26 to the reservoir 24.

Spring 118 remains compressed as previously described and piston 120 maintains the slidable sleeve 122 at a point away from ring 116, thereby interrupting the ground path for the motor 98. The motor 98 is therefore inoperative and will act as a stand-by for the auxiliary system until a failure is experienced in the primary system powered by the engine driven pump 22.

With the primary system functioning and the auxiliary system on stand-by, the power booster 10 is poised for actuation upon demand. Pressure on the brake pedal 12 actuates the power booster in the manner previously described to provide a power boost for the master cylinder 16. During this period of time, the transfer valve 56 is in a closed position similar to the position it assumes upon engine shut down in the system of the first embodiment.

If failure occurs in the primary system, a pressure loss is experienced at the inlet 60. Immediately, the valve member 124 carrying the elastomeric material 126 moves to engage the seat 128 from pressure exerted by the spring 130. The ball 82, no longer restrained by the rod 90, moves to seal off the open center of the piston 76. Further fluid flow to the outlet 86 is prevented and the spring 80 seats the piston 76 against wall 78. Pressure is thereby lost in the second chamber 74 resulting in the compressed spring 118 driving the piston 120 to the right, as viewed in FIGURE 2. As piston 120 moves, the slidable sleeve 122 is carried into conductive engagement with ring 116. A ground is immediately established for the motor 98 through lead 106, pin 108, spring 118, sleeve 122, ring 116 to the grounded valve body 111. When this occurs, the motor 98 is ready for actuation upon the closing of the brake pedal operated switch 104. It should be noted that the operation of the transfer valve of the primary system is almost immediate and fluid is present throughout the booster 10 and in the lines 30 and 36 of the auxiliary system.

When the system is in the condition just described, the pivotal movement of the brake pedal 12 to bring about a braking action will result in immediate closing of the switch 104 and, consequently, the energization of the motor 98. The pump 32 immediately provides a pressure on the fluid in the inlet of transfer valve 56 and the functioning thereof is exactly as described by the operation of transfer valve 54 of the first embodiment. Therefore, pressure is immediately provided for the booster 10 by the auxiliary system when a failure occurs in the primary system. Power brake capability exists as before and the braking ability of the vehicle is not impaired.

The two embodiments of the present invention described herein provide immediate transferring capabilities for a power braking system upon a pressure loss in the system currently functioning. It is understood that a failure in the braking systems described may be attributable to a hydraulic leak or a pump failure. In either case, the failed system is immediately isolated from the functioning portion of the braking system without a measurable passage of time. This results in a minimum loss of braking pressure and the response of the valves precludes the existence of a period of time in which a powered braking capability is not had.

It is obvious that either of the embodiments described herein can be designed to have a desired response range suitable for a given installation without adding to the inventive concept disclosed herein. It is also understood that the positioning of the transfer valves in both embodiments relative to the brake booster is optional and they have been shown in FIGURES 1 and 2 in only one possible location. The fluid communication links between the inlets 42 and 72 can be arranged to suit the operative environment in which the invention is to function. The integral nature of the transfer valves to the booster is desirable in many installations and represents a solution to manufacturing problems and economies that may not be desirable in a given installation.

While the embodiments of the present invention, as herein disclosed, constitute preferred forms, it is to be understood that other forms might be adopted.

What is claimed is as follows:

1. In combination, a transfer valve and a vehicle braking system having a primary pressure system and an auxiliary pressure system, said transfer valve comprising: a valve body; a first inlet in said valve body from a pressure source; first means for selectively closing said inlet in said valve body; a first outlet in fluid communication with said inlet to the vehicle braking system, said braking system also being in communication with said auxiliary pressure system; a second inlet in said valve body from the vehicle braking system; a second outlet to the pressure source; and second means including a pressure responsive sliding piston and a relatively fixed ball for selectively isolating said second inlet from said second outlet in response to a loss of pressure from the pressure source, said ball being held stationary against said piston by a differential pressure produced by said auxiliary pressure system to prevent further fluid communication from the pressure source to said first outlet thereby effectively isolating the primary braking system from the auxiliary braking system, said piston normally held stationary by shifting of said first means, while said piston moves relative to said ball to allow fluid communication thereby under normal operating conditions.

2. In combination, a transfer valve and a vehicle braking system having a primary pressure system and an auxiliary pressure system, said transfer valve comprising: a valve body; first inlet means in said valve body to said valve body from the pressure source of the primary system; first outlet means from said valve body to the vehicle braking system, said braking system also being in communication with said auxiliary pressure system; first means for isolating said first inlet means from said first outlet means in response to a pressure decrease in the pressure source of the primary system; second inlet means in said valve body from the vehicle braking system; second outlet means from said valve body to the pressure source of the primary system; and second means including an unrestrained ball carried by said valve body and responsive to said first means and to a pressure decrease in said primary system to shut off pressure communication between said second inlet means and outlet means thereby isolating the primary braking system from the auxiliary braking system.

3. In combination, a transfer valve for isolation of an inoperative pressure system from an operative pressure system and a braking system having a primary and auxiliary pressure systems including booster means for said braking system, said transfer valve comprising: a valve body; first inlet means to said valve body from a primary pressure source; first outlet means from said valve body to the booster means, said first outlet means being in fluid communication with said first inlet means and said auxiliary pressure system; first means including a guided ball carried by said valve body and arranged to interrupt the fluid communication between said first inlet means and said first outlet means as a pressure system in a braking system becomes inoperative thereby preventing back flow to the pressure source of the inoperative system; second inlet means carried by said valve body and communicating fluid from the booster means to said valve body; second outlet means carried by said valve body and arranged for return fluid flow from said valve body to the primary pressure source, said second inlet means normally being in fluid communication with said second outlet means; and second means including a slidable open center piston and an unrestrained ball adapted to block said open center portion of said piston carried by said valve body and adapted to selectively interrupt and complete the fluid communication between said second inlet means and said second outlet means in response to the inlet pressure induced disposition of said first means in said valve body thereby selectively isolating an inoperative pressure system from the booster means during a condition of inoperativeness of the pressure system.

4. The combination according to claim 3 wherein the first means includes a guided ball check valve having a rod attached thereto for positively controlling the movement of the unrestrained ball, said rod also holding said ball of said second means off its seat on said open center piston under normal pressure conditions of said primary system.

5. The combination according to claim 3 wherein the first means is a spring loaded resilient member having a rod attached thereto for positively guiding the resilient member as it engages said first inlet means.

6. The combination according to claim 3 wherein the first means drives a slidable rod and the second means comprises: a chamber in said valve body; a piston slidable in said chamber in response to pressure increases and having an open center, normally closed by an unrestrained ball, a spring biasing said piston into sealing engagement with a portion of the wall of said chamber; and an unrestrained ball slidably disposed in the open center portion of the piston and arranged to selectively seat and unseat in its mounting in response to pressure in said booster body thereby controlling fluid flow through the open center piston.

7. The combination according to claim 6 wherein the ball is held by pressure from the rod of the first means under one operating condition and wherein the ball is unseated by relative movement of said piston under another operating condition, with said ball remaining stationary, said ball being seated by a differential pressure on either side of said ball.

8. In combination, a braking system having a primary and a secondary pressure system wherein only one system is operating at a time, and a transfer valve connected between said primary and secondary systems, the improvement comprising: a valve body having first and second chambers formed therein connected by an aperture; said first and second chambers each having an inlet and outlet; first valve means disposed in said first chamber and responsive to pressure from said primary pressure system for translational reciprocating movement therein between an inlet and outlet; second valve means disposed in said second chamber and including a portion arranged for translational movement therein between an inlet and an outlet; said first valve means including a rod slidable in the aperture between said first and second chambers thereby making said second valve means responsive to movement of said first valve means, and switch means carried in said valve body and responsive to movement of said rod in said second chamber and said second valve means to energize a pressure source for the secondary pressure system when the primary pressure system becomes inoperative.

9. The combination of a transfer valve for isolating a primary pressure system and energizing a secondary pressure system and a power braking system having a brake booster and primary and secondary pressure systems wherein one system is operating and one is a stand-by, said transfer valve comprising: a valve body having first and second chambers formed therein; a first inlet into said first chamber from the primary pressure source and a first outlet from said first chamber to the brake booster; first valve means having an extension portion and a portion normally disposed in sealing engagement with said first inlet and slidable out of engagement therewith in response to a pressure build-up in the primary pressure source thereby routing pressure to the brake booster; a second inlet into said second chamber from the brake booster; a second outlet from said second chamber to the primary pressure source; second valve means including an open center pressure responsive piston and a slidable check valve disposed in the center thereof, said ball being held in a static state by said extension of said first valve means when pressure builds up in said primary pressure source and said brake booster, said slidable check valve movable relative thereto under pressurized conditions, said second valve means being operatively disposed between the inlet and the outlet of said second chamber and being responsive to a pressure build-up in the power booster and the primary pressure source to bring the brake booster into fluid communication with the primary pressure source; and a switch responsive to a force applied thereto by said check valve at first extreme of movement, said switch electrically engageable with a power source for the secondary pressure system, said switch responsive to a decrease in force from said slidable check valve as it moves to a second extreme of movement in said second chamber to energize the power source of the secondary pressure system thereby providing an alternate pressure for the brake booster during operating conditions when the primary pressure system is pressurized below a predetermined acceptable range.

10. The combination according to claim 9 wherein the switch includes a chamber auxiliary to said second chamber having a lead disposed in one end thereof engaging the power source of the secondary pressure system, a conductive element slidably disposed in said auxiliary chamber and adapted to engage a conductive portion of the valve body representing ground, a piston having a portion engaging the slidable conductive element and a portion slidably disposed in said second chamber and responsive to a force therein, and conductive resilient means engaging said lead and said slidable conductive element to provide a continuous conductive path between the lead and the conductive portion of the valve body when the piston is in a shifted position.

11. The combination according to claim 9 wherein an aperture connects said first and second chambers and a rod engaging said first valve means slidable in said aperture to drive the check valve from a seat in the open center piston when a pressure build-up is experienced at the inlet to said first chamber, said check valve being seated in the open center piston when pressure at the outlet to said second chamber is less than pressure at the inlet to said second chamber.

References Cited

UNITED STATES PATENTS

| 2,848,876 | 8/1958 | Schnell | 60—54.6 |
|---|---|---|---|
| 2,884,905 | 5/1959 | Jensen | 91—463 |
| 2,908,137 | 10/1959 | Spalding et al. | 60—54.6 |
| 2,945,352 | 7/1960 | Stelzer | 91—28 |
| 3,030,930 | 4/1962 | Gratzmuller | 91—420 |
| 3,094,843 | 6/1963 | Martin | 60—54.5 |
| 3,136,223 | 6/1964 | Evans et al. | 91—420 |
| 3,176,467 | 4/1965 | Van House | 60—54.6 |

MARTIN P. SCHWADRON, *Primary Examiner.*

B. L. ADAMS, *Assistant Examiner.*